May 21, 1935.  E. G. THOMAS  2,002,379
CONTROLLING DEVICE
Filed Jan. 5, 1928  3 Sheets-Sheet 1
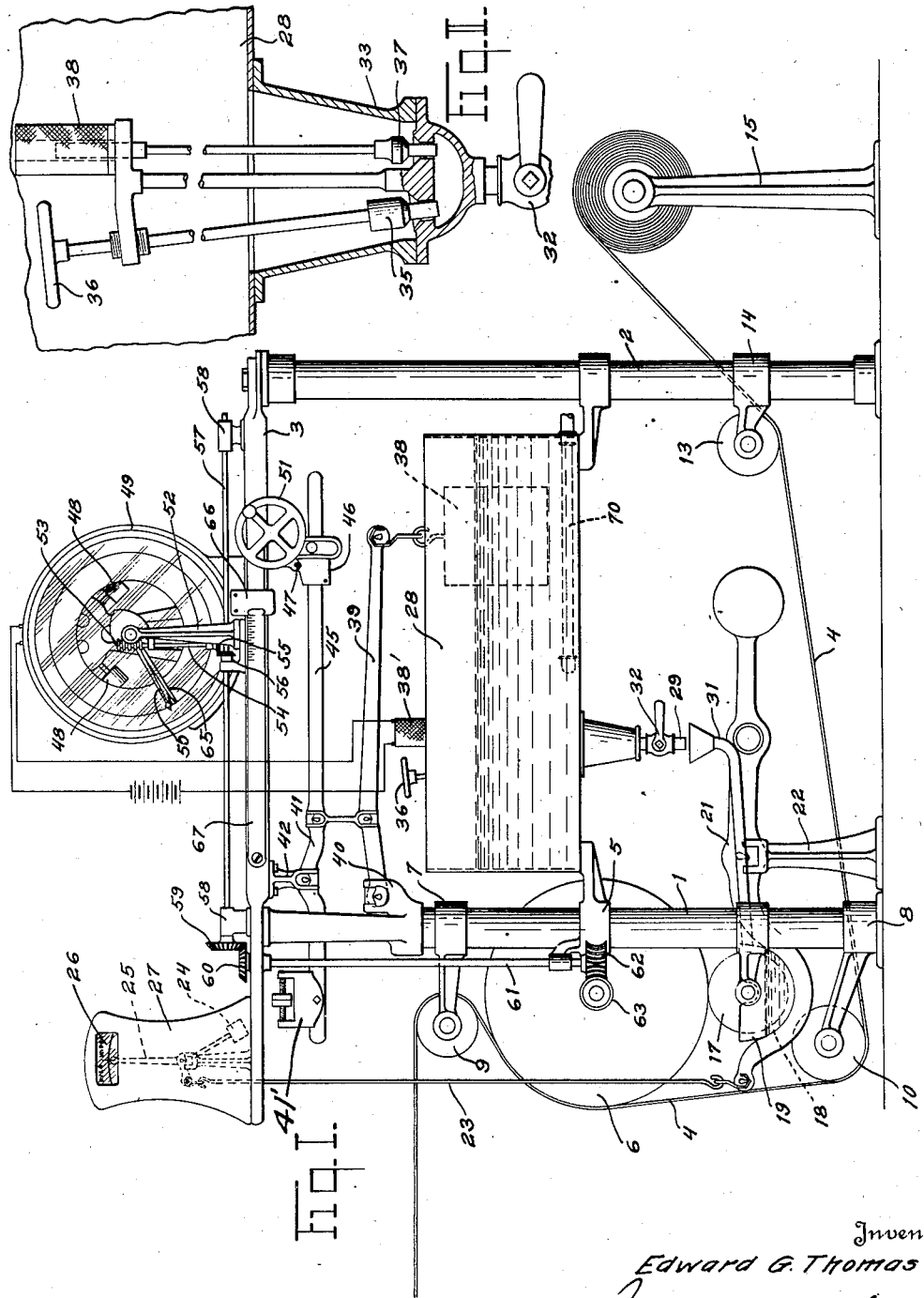
Inventor
Edward G. Thomas
By C. O. Marshall
Attorney

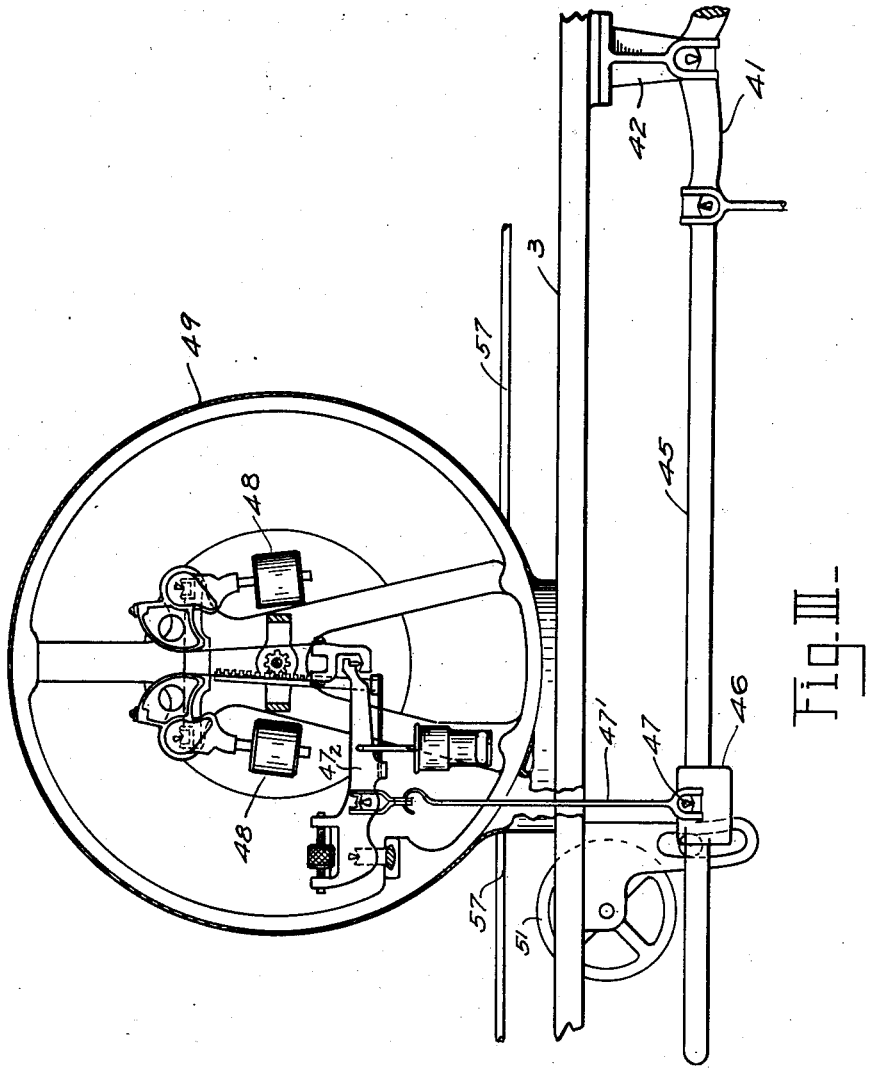

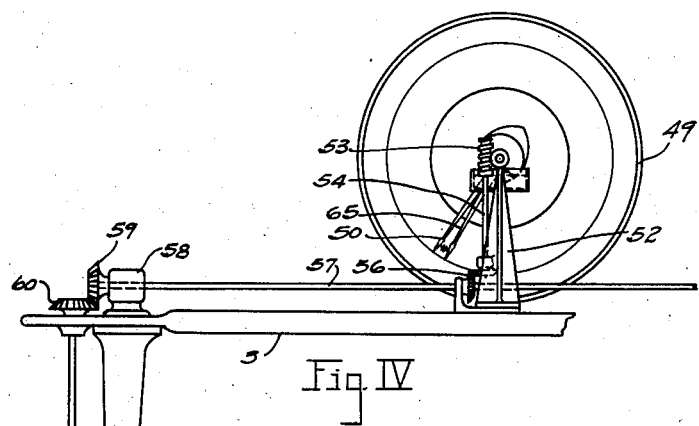
Fig. IV
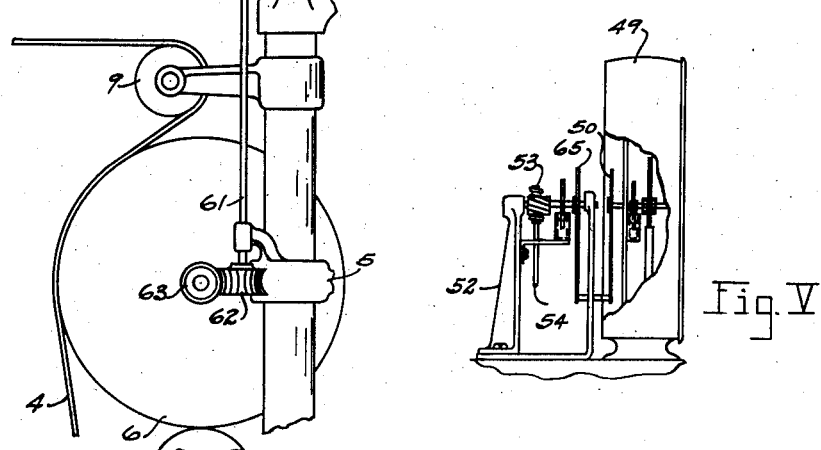
Fig. V
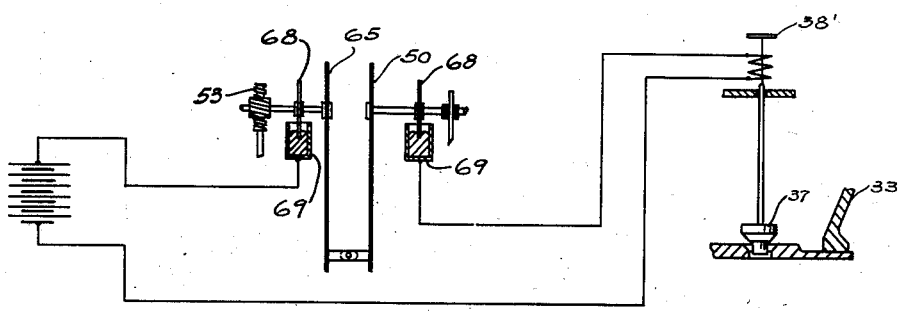
Fig. VI
Edward G. Thomas
INVENTOR
BY C. O. Marshall
ATTORNEY Patented May 21, 1935

2,002,379

UNITED STATES PATENT OFFICE 2,002,379

CONTROLLING DEVICE

Edward G. Thomas, Toledo, Ohio, assignor to Toledo Scale Manufacturing Company, Toledo, Ohio, a corporation of New Jersey Application January 5, 1928, Serial No. 244,593

5 Claims. (Cl. 137—68)

The invention relates to devices for securing uniformity of product, and particularly to devices for producing uniformly coated or impregnated material. In the manufacture of such products as, for example, oil cloth, coated fabrics, artificial leathers and the like, it is desirable to coat or impregnate a continuously moving strip of fabric with a certain amount of compound per unit of length so that the finished product will be of uniform weight and character. In many processes for manufacturing such products the gaging or checking of the amount of compound being applied depends wholly upon the skill and vigilance of the operator, who usually estimates from the appearance of the product in the course of manufacture whether or not the amount of the coating compound should be increased or decreased. The principal object of this invention is to provide automatic means for insuring the incorporation in each strip of material of a definite quantity of coating or impregnating compound. It is to be understood, however, that my invention is not limited to devices for treating sheet material with liquids or semi-solids, but that it is also applicable for use with devices for treating body material of other forms, such as cordage and series of separate pieces. It may be used for controlling the rate of supply of granular material for application to sandpaper, or the supply of comminuted mineral to be applied to sheet roofing.

Another object of the invention is the provision of means for automatically controlling the flow of coating or impregnating compound whereby the rate at which said compound is supplied to the material is kept in definite ratio to the rate at which the product is turned out.

Another object is the provision of means whereby the flow controlling apparatus may be adjusted to supply the compound at a rate in any desired ratio to the rate at which the product is delivered.

Another object is the provision of simple means for indicating to the operator the correct amount of compound in the trough surrounding the coating roll.

Still a further object is the provision of automatic means for controlling or delivering a constant flow of compound to the coating apparatus which is directly proportional to the rate of movement of the coated product.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a device embodying my invention;

Figure II is an enlarged fragmentary sectional detail view showing the compound controlling valves and operating mechanism.

Figure III is an enlarged fragmentary front elevational view with parts removed to show pendulum load-counterbalancing mechanism and connections.

Figure IV is an enlarged fragmentary front elevational view showing a portion of the operating mechanism in greater detail.

Figure V is a similarly enlarged fragmentary side elevational view showing in detail the mechanism of the upper part of Figure IV.

Figure VI is a wiring diagram showing a circuit employed in the embodiment of the invention illustrated.

Referring to the drawings in detail, the mechanism is principally supported upon two pairs of fixed standards 1 and 2 which are joined together at their upper ends by means of a frame 3. One standard of each pair is positioned at the rear of the standard shown in Figure I and is hidden from view by the standard illustrated in the figure. The standards 1 are provided with brackets 5, upon which is journaled the coating drum 6 and brackets 7 and 8 which support guide drums 9 and 10. The material 4 to be coated is passed around the guide drums 9 and 10, engaging the periphery of the coating drum 6, thence under another guide drum 13 supported upon brackets 14 carried by the standards 2, and is finally collected upon a roller journaled in bearings mounted in the upper end of supporting standards 15.

The lowermost portion of the periphery of the coating drum 6 is in continuous engagement with the cylindrical surface of a supplemental drum 17 partially immersed in the coating or impregnating compound 18, the compound being contained in an elongated pan or trough 19. A certain amount of the compound 18 adheres to the surface of the dipping drum 17, the major portion of which is transferred to the surface of the coating drum 6, thence onto the material 4. The quantity of coating compound that adheres to the sheet material 4 as it passes over the drum 6 depends upon the quantity of the compound in the trough 19. It is, therefore, imperative that a constant quantity of compound be maintained in the trough to insure a uniform coating upon the material 4. The trough 19 is, therefore, supported upon levers 21, only one of which is shown, fulcrumed upon standards 22, the nose end of one of the levers 21 being connected by means of a link 23 to a pendulum load-counterbalancing element 24 and an indicator 25 adapted to co-operate with a chart 26, the mechanism being supported within a housing 27 fixedly supported upon an extended portion of the frame 3. It will be apparent that an increase or diminution of the quantity of compound in the trough 19 from a predetermined quantity will cause the indicator 25 to be moved out of registration with the central graduation on the chart 26 and indicate to the operator that the quantity of compound in the trough is not correct. He may then adjust the temperature of the compound, the pressure of the rolls or other controls to restore the liquid to proper level.

The compound in the trough is replenished from a supply tank 28 through the outlet pipe 29 which registers with the enlarged mouth of a tube 31 leading into the trough 19. The outlet pipe is provided with a master valve 32 located at the lower end of a chamber 33 containing a manually controlled valve 35 operated by means of a hand wheel 36 and an automatic valve 37 operated by means of an electrically energized solenoid 38¹. The valve 35 is normally opened sufficiently to permit compound to pass from the tank 28 to the trough 19 at a rate somewhat less than the rate at which it is deposited upon the strip of sheet material. The supplemental valve 37 is controlled by a device, the purpose of which is to cause the compound to be discharged from the supply tank 28 at a rate which is directly proportional to the rate at which the sheet of material passes over the coating drum 6 for any desired weight of coating per unit of length of the sheet material.

A weight 38 is suspended in the coating compound within the tank 28, the weight depending from one end of a lever 39 suitably fulcrumed on a bracket 40 mounted upon the upper extremity of one of the standards 1. The lever 39 is connected intermediate its ends to a second lever 41 fulcrumed upon a bracket 42 depending from the frame 3 and having a counterweight 41' with adjustable balance ball fixed opposite its fulcrum from its connection to the lever 39 to assist in supporting the weight of the lever 39 and in bringing the weighing mechanism readily into balance. The lever 41 is formed with a beam 45 upon which is slidably mounted a movable bracket 46 carrying a knife edge pivot 47 which is connected by means of a stirrup rod 47¹ and a transmitting lever 47² to the automatic load-counterbalancing pendulums 48 supported within the watch-case-shaped housing 49. The pendulums 48 are connected in the usual way by means of rack and pinion mechanism to a hand 50 so that the angular position of the hand is dependent upon the quantity of compound in the supply tank 28. The head 49 is slidably supported upon the frame 3 and is moved along the frame by means of a hand wheel 51 co-operating with suitable rack and pinion mechanism (not shown).

The mounting of the pendulum mechanism and its connection to the beam 45 are the same as in the well-known "Toledo" yardage scale and are fully illustrated and described in U. S. Letters Patent No. 1,656,454. Since they themselves are not the subject of this application, I have illustrated them only in sufficient detail to show the relation of the other features of my invention to them.

Secured to the head 49 so as to be movable therewith is an upright 52, and revolubly supported at its upper end is a worm wheel meshing with a vertically positioned worm 53 fixedly secured to the upper end of a shaft 54, the lower end of the shaft 54 being equipped with a bevel gear 55. The gear 55 is in constant mesh with a similar bevel gear 56 slidably carried upon a horizontal shaft 57 revolubly supported in bearing brackets 58 mounted upon the frame 3. One end of the shaft 57 is provided with a bevel gear 59 meshing with a similar gear 60 secured to the upper end of a vertically positioned shaft 61, and secured to the lower end of the shaft is a worm wheel 62 in mesh with and adapted to be driven by a worm gear 63 connected to the coating drum 6.

Connected to the worm wheel carried by the bracket 52 is a movable hand 65 arranged in juxtaposition to the hand 50 controlled by the position of the load-counterbalancing mechanism. The shafts carrying the hands 50 and 65 are provided with conducting disks 68 dipping into mercury containing cups 69 and the hands are equipped with electrical contacts which are brought into engagement in a manner to effect a closing of the circuit energizing the solenoid 38¹, thus opening the valve 37.

The operation of the device is as follows: Assuming that the machine is operating, the material or fabric to be coated passing over the coating drum 6 collects a coating of the compound which has been picked up from the drum 17 that rotates in the compound carried in the trough 19. The indicator at 26 is provided to indicate to the operator whether the predetermined quantity of compound in the trough 19 is constantly maintained. If the indicator swings to the left, it indicates that the proper amount of coating is not being removed from the trough 19 with a consequent decrease in the thickness of the coating upon the treated material. If the indicator swings to the right, it indicates that too much compound is adhering to the material.

It is evident that the pull upon the lever 39 and consequent pull on the pendulums 48 exerted by the weight 38 is dependent upon the position of the slide 46 upon the beam 45. The less the distance between the pivot 47 and the fulcrum of the lever 41, the greater the pull exerted by the weight 38 and the greater the angular movement of the hand 50 for a given decrease in the volume of the contents of the tank 28. By moving the slide 46 along the beam 45 the device may, therefore, be set to cause the rate of movement of the hand 50 to be in any desired ratio to the rate of decrease of the contents of the tank 28. By this means it is possible to control the thickness of the compound to be taken up by the strip of material 4, the position of the slide being indicated by the indicator 66 co-operating with the graduated bar 67.

Before the coating machine is set in motion, the operator, by means of the hand wheel 51, moves the head 49 and associated mechanism horizontally until the indicating plate 66 registers with the graduation indicating the amount of coating compound to be used per unit of length of material to be coated. The initial position of the load-counterbalancing mechanism is immaterial, as the only function of this mechanism is to cause the indicator 50 to move at a rate proportional to the rate of flow of the compound past the valve 37. The indicator 50, therefore, moves in a clockwise direction, the load-counterbalancing pendulums offsetting a continuously increasing weight which is equivalent to the apparent increase in downward pull of the weight 38 due to the decrease in the buoying effect of the fluid upon the weight 38 as the level of the compound in the tank 28 is lowered. The indicator 50, therefore, travels at a rate proportional to the rate of decrease of the fluid compound displaced by the weight 38. The manually controlled valve 35 is opened by means of the hand wheel 36 so that the rate of flow of compound is slightly less than that which experiment has determined is required to coat the material to the desired thickness or weight per square yard. Simultaneously with the flow of compound past the valve 35, the arm 65 is being rotated in the same direction as the hand 50 through the medium of the system of gearing hereinbefore described connected to and driven by the coating drum 6. Should the flow of compound from the tank 28 be less than the required amount, the arm 65 will move faster than the hand 50 controlled by the weighing mechanism and engage the latter, thereby closing the electrical circuit and energizing the solenoid 38¹ to open the supplemental valve 37 and increase the rate of flow of the compound into the trough 19. This increased rate of flow continues until enough additional fluid has been drawn from the supply tank to cause the weight controlled hand 50 to move away from the arm 65, thus separating the contacts and breaking the solenoid circuit and permitting the valve 37 to close by gravity and decrease the rate of flow of the compound. In this manner the rate of flow of the compound is automatically maintained uniform, thus obviating the necessity of employing a skilled workman to regulate the coating by conjecture.

The indicator 25 shows the operator whether or not the predetermined quantity of compound is being maintained in the trough 19. If the indicator registers "under" or "over" of the central mark upon the chart 26, the operator knows that the compound collecting drum 6 is placing too much or too little compound upon the strip material and he must either change the rate of flow of the compound by adjusting the hand wheel 36 or the viscosity of the compound by regulating the heat applied in the tubes 70. As the control of the viscosity of the compound forms no part of this invention, it is not described herein. The arm 65 is frictionally retained to its shaft and may be manually returned to its initial position. This, however, need only be done whenever the tank 28 is refilled.

As is usual in weighing devices, the capacity of the tank 28 is such that the hand 50, which rotates as the level of the liquid in the tank is lowered, moves only from initial position at the left side of the upright 52 to final position at the right side of the upright 52. The hand does not make repeated revolutions in the same direction during a cycle of operations, but makes slightly less than a single revolution in a clockwise direction as the liquid flows from the tank 28. When the tank is refilled, the hand moves counterclockwise, thus returning to its initial position.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a receptacle adapted to contain a liquid material, a valve in said receptacle, a body suspended in said liquid and partially supported thereby, automatic load-counterbalancing mechanism, means connecting the suspended body and said load-counterbalancing mechanism, said mechanism thereby supporting the portion of the weight of said body not supported by said liquid, and means connected to said load-counterbalancing mechanism to control said valve mechanism.

2. In a device of the class described, in combination, a supply tank for containing a liquid material and having an outlet for said liquid material, a member adapted to be suspended in said liquid material, and means including pendulum load-counterbalancing mechanism connected to said suspended member for regulating the rate of flow of said liquid material through said outlet.

3. In a device of the class described, in combination, a supply tank containing a liquid material and having an outlet for said liquid material, a member adapted to be partially immersed in said liquid material, pendulum load-counterbalancing mechanism supporting said member, and means cooperating with said pendulum load-counterbalancing mechanism for automatically regulating the rate of flow of said liquid material through said outlet.

4. In a device of the class described, in combination, a receptacle adapted to contain a liquid material, valve mechanism connected to said receptacle, pendulum load-counterbalancing mechanism, means cooperating with said pendulum load-counterbalancing mechanism whereby a decrease in the amount of said liquid material in said receptacle causes an increasing force to act upon said pendulum load-counterbalancing mechanism, and means to be actuated by movement of said pendulum load-counterbalancing mechanism to control said valve mechanism.

5. In a device of the class described, in combination, a receptacle adapted to contain a liquid material, a valve in said receptacle, a body suspended in said liquid material, pendulum load-counterbalancing mechanism, means connecting the suspended body to said pendulum load-counterbalancing mechanism, means whereby a decrease in volume of liquid in said receptacle acts upon said pendulum load-counterbalancing mechanism to control said valve mechanism, and means operatively connected to said pendulum load-counterbalancing mechanism for visibly indicating by relative position variations in the amount of such liquid material in said receptacle.

EDWARD G. THOMAS.